United States Patent
Rhyne et al.

(10) Patent No.: US 7,066,225 B2
(45) Date of Patent: Jun. 27, 2006

(54) RUNFLAT INSERT FOR TIRES AND MATERIALS THEREFOR

(75) Inventors: Timothy B. Rhyne, Greenville, SC (US); Steven M. Cron, Simpsonville, SC (US); Kenneth W. Demino, Anderson, SC (US); Michael D. Grah, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/757,066

(22) Filed: Jan. 14, 2004

(65) Prior Publication Data

US 2004/0144464 A1 Jul. 29, 2004

Related U.S. Application Data

(63) Continuation of application No. PCT/US01/51156, filed on Oct. 29, 2001, which is a continuation-in-part of application No. PCT/US01/23163, filed on Jul. 19, 2001.

(51) Int. Cl.
*B60C 17/04* (2006.01)
*B60C 17/06* (2006.01)
*B60C 1/00* (2006.01)

(52) U.S. Cl. ........................ 152/158; 152/520
(58) Field of Classification Search ................ 152/158, 152/520
See application file for complete search history.

(56) References Cited

U.S. PATENT DOCUMENTS

| | | | | |
|---|---|---|---|---|
| 6,769,465 | B1 * | 8/2004 | Rhyne et al. | 152/197 |
| 2004/0140032 | A1 * | 7/2004 | Rhyne et al. | 152/158 |
| 2004/0187996 | A1 * | 9/2004 | Grah | 152/516 |

* cited by examiner

*Primary Examiner*—Adrienne C. Johnstone
(74) *Attorney, Agent, or Firm*—E. Martin Remick; Frank J. Compigotto; Adam Arnold

(57) ABSTRACT

The invention is a runflat insert comprising an outer contacting portion for contacting the interior surface of the tire during deflated operation; a reinforced annular band disposed radially inward of the outer contacting portion comprising an elastomeric shear layer, a membrane adhered to the radially inward extent of the elastomeric shear layer and a second membrane adhered to the radially outward extent of the elastomeric shear layer; a sidewall portion extending radially inward from the contacting portion for connecting the annular band to a base member fitted around the wheel rim for securing the insert to the rim; and a carcass layer adhered to the annular band and extending radially inward from the annular band and anchored in the base member. The elastomeric shear comprises a dienic composition that includes a metal salt of an unsaturated carboxylic acid and a peroxide curative agent.

27 Claims, 5 Drawing Sheets

RUNFLAT INSERT FOR TIRES AND MATERIALS THEREFOR

RELATED APPLICATIONS

The present application is a Continuation of and claims priority to PCT/US01/51156 filed on Oct. 29, 2001, titled "Runflat Insert for Tires" with applicants Societe de Technologie Michelin (except for Canada, Mexico and the United States), Michelin Recherchéet Technique S.A. (except for the United States) and Timothy B. Rhyne, Kenneth W. Demino, Steven M. Cron and Michael D. Grah (for the United States); which application is a Continuation-in-Part of and claims priority to PCT/US01/23163 filed on Jul. 19, 2001, titled "Runflat Insert for Tires" by applicants Societe de Technologie Michelin (except for Canada, Mexico and the United States), Michelin Recherchéet Technique S.A. (except for the United States) and Timothy B. Rhyne, Kenneth W. Demino and Steven M. Cron (for the United States).

FIELD OF THE INVENTION

The present invention is in the field of runflat tires.

BACKGROUND OF THE INVENTION

Many solutions have been proposed to provide continued vehicle mobility after loss of inflation pressure in a pneumatic tire. One class of solutions involves fixing a rigid or semi-rigid insert to the wheel rim and inside the tire. Upon loss of inflation pressure, the vehicle is supported by load transmission from the portion of the insert contacting the inside of the tire directly through the insert structure to the wheel rim. However, a solution having a structurally supported runflat insert that delivers pneumatic tire-like performance would be a welcome performance improvement.

SUMMARY OF THE INVENTION

The present invention is a runflat insert having improved characteristics in load carrying, vehicle handling, mass, and shock transmission, wherein an outer, reinforced annular band is coupled with a sidewall structure having little resistance to compressive loads. Such a runflat insert for enabling a vehicle to run for limited duration on a deflated tire, is mounted in an assembly comprising a pneumatic tire and a wheel rim, and said insert is mounted inside the air cavity of the tire and secured to the wheel rim, said insert comprising:

a) an elastomeric outer contacting portion for contacting the interior surface of the tire during deflated operation of the tire, and b) a reinforced annular band disposed radially inward of said outer contacting portion, wherein said band comprises an elastomeric shear layer, at least a first membrane adhered to the radially inward extent of said elastomeric shear layer and at least a second membrane adhered to the radially outward extent of said elastomeric shear layer, and c) at least one sidewall portion extending radially inward from said contacting portion for connecting said annular band to a base member fitted around the wheel rim for securing said insert to the rim, and d) at least one carcass layer adhered to said annular band, and said carcass extending radially inward from said annular band and anchored in said base member;

wherein the shear layer comprises an elastomeric composition that includes a metal salt of a carboxylic acid. The shear layer preferably comprises a dienic elastomeric composition that includes a metal salt of a carboxylic acid and is preferably cured with a peroxide curative agent. In one embodiment of the invention, the metal salt of the carboxylic acid is zinc diacrylate or zinc dimethacrylate.

When the vehicle tire deflates and/or the tire deflects sufficiently, the insert contacts the interior surface of the tire. The applied load flattens the annular band. The deformation of the band causes tensile forces to develop in that portion of the sidewall that is out of contact with the tire. The vehicle wheel effectively hangs from the annular band by the sidewall portions. The sidewall portion is essentially inextensible in tension, but has little resistance to compressive buckling. Conversely, in rigid or semi-rigid inserts, the inserts support the load by compression in the portion of insert in contact with the interior surface of the tire.

Runflat inserts may be tightly fixed to the wheel rim or require the use of extra material or spacers to maintain proper lateral location of the insert on the rim. In the instant invention, the base member has a high resistance to rotation about a longitudinal axis. The base member may have monolithic cores comprising a generally rectangular cross-section having a width of about five percent of the section width of the insert, and the core has a height equal to about fifty percent of its width. Alternatively, the core may comprise one of several arrangements of reinforcing wires. When this base member structure is coupled with radially oriented sidewall portions, the insert has the advantage of maintaining a stable alignment on the rim and requires no additional internal spacers or reinforcements.

Performance of the insert improves when the sidewall portion is biased to buckle advantageously in an axially outward direction when subjected to compressive loading. In the instant invention the sidewall is biased by an elastomeric wedge positioned in the sidewall essentially mid way between the first membrane and the base member. The wedge forces a curvature in the profile of the carcass layer. When the wedge is combined with the proper thickness of rubber on the outside of the carcass layer, the invention obtains the desired result of a consistent outward buckling of the sidewall in the region contacting the tire.

A properly inflated pneumatic tire exerts a relatively uniform contact pressure against the road surface. When rigid or semi-rigid inserts deform under load to support the wheel, the contact pressure with the interior of the tire is non-uniform. However, the insert according to the invention, when deflected against the inside of a deflated tire, exhibits a relatively uniform contact pressure and a contact area similar to that of a pneumatic tire. This attribute exists when the ratio of the longitudinal tension and compression moduli of each of the membranes to the shear modulus of the shear layer is at least 100:1. That is to say that the membranes behave as essentially inextensible and deformation of the annular band is accommodated by shear strain in the elastomeric shear layer. The functional mechanism of the annular band is the same as that described in U.S. Pat. No. 6,769,465 B2, owned in common with the instant application. As described therein (see column 2. lines 23–44), the shear modulus of elasticity of the elastomeric shear layer is sufficiently lower than the tensile modulus of elasticity of the first and second membranes such that, under an externally applied load, the ground contacting tread portion deforms from essentially a circular shape to a flat shape while maintaining an essentially constant length of the membranes. The runflat insert of the invention functions as a non-pneumatic load carrying device.

In one embodiment of the invention, each membrane is comprised of a pair of biased cord-reinforced layers with the cords arranged at an angle of about 10 degrees to about 20 degrees with the centerline of the insert. In one embodiment of the invention, the elastomeric shear layer has a shear modulus of elasticity between about 3 MPa and about 20 MPa. The shear layer preferably has low level of hysteresis with tangent delta less than or equal to about 0.1.

The invention permits the designer to adjust the effective contact pressure as a design parameter of the insert. The contact pressure is approximated by the product of the shear modulus of elasticity of the shear layer, times the radial-thickness of the annular band, and divided by the radius of the outermost extent of the second membrane. This contact pressure will normally be in the range of about 2 bar to about 6 bar. A contact pressure of about 3 bar yields a good compromise between the size and mass of the insert and vehicle performance.

From the point of view of load capacity, the ideal insert may have a section width and a section height limited only by the requirement of non-contact with the tire during normal operation. In a preferred form of the invention, the insert has a section width between about 50% to about 70% of the tire section width, and a section height between about 40% to about 60% of the tire section height.

BRIEF DESCRIPTION OF THE DRAWINGS

FIG. 1 shows the loaded assembly, with the tire in a deflated state.

DETAILED DESCRIPTION OF THE INVENTION

The present invention is a runflat insert having improved characteristics in load carrying, vehicle handling, mass, and shock transmission, wherein an outer, reinforced annular band is coupled with a sidewall structure having little resistance to compressive loads. Such a runflat insert for enabling a vehicle to run for limited duration on a deflated tire, is mounted in an assembly comprising a pneumatic tire and a wheel rim, and said insert is mounted inside the air cavity of the tire and secured to the wheel rim, said insert comprising:

a) an elastomeric outer contacting portion for contacting the interior surface of the tire during deflated operation of the tire, and b) a reinforced annular band disposed radially inward of said outer contacting portion, wherein said band comprises an elastomeric shear layer, at least a first membrane adhered to the radially inward extent of said elastomeric shear layer and at least a second membrane adhered to the radially outward extent of said elastomeric shear layer, and c) at least one sidewall portion extending radially inward from said contacting portion for connecting said annular band to a base member fitted around the wheel rim for securing said insert to the rim, and d) at least one carcass layer adhered to said annular band, and said carcass extending radially inward from said annular band and anchored in said base member;

wherein the shear layer comprises an elastomeric composition that includes a metal salt of a carboxylic acid. The shear layer preferably comprises a dienic elastomeric composition that includes a metal salt of a carboxylic acid and is preferably cured with a peroxide curative agent. In one embodiment of the invention, the metal salt of the carboxylic acid is zinc diacrylate or zinc dimethacrylate.

The following nomenclature and definitions are common to all variations of the invention disclosed herein. Similar reference numbers are used throughout to describe the same element or material. Similar elements are not discussed in detail when disclosed in a subsequent variation of the invention.

Definitions of terms:

"Inner" or "inward" means toward the interior of the insert.

"Outer" or "outward" mean towards the exterior of the insert.

"Axial" refers to a direction that is parallel to the axis of rotation of the insert "Radial" refers to a direction perpendicular to the axis of rotation of the tire.

"Modulus" of elastomeric materials means the tensile modulus of elasticity measured at 10 percent elongation.

"Modulus" of the membranes means the tensile modulus of elasticity at 1 percent elongation multiplied by the effective thickness of the membrane.

"Shear Modulus" of elastomeric materials means the shear modulus of elasticity and is defined equivalent to one-third the tensile modulus of elasticity measured at 10 percent elongation.

"Hysteresis" means the tangent delta measured at 100 degrees Celsius under a 30 Hz, 50 percent peak-to-peak dynamic shear strain.

Figure 1:
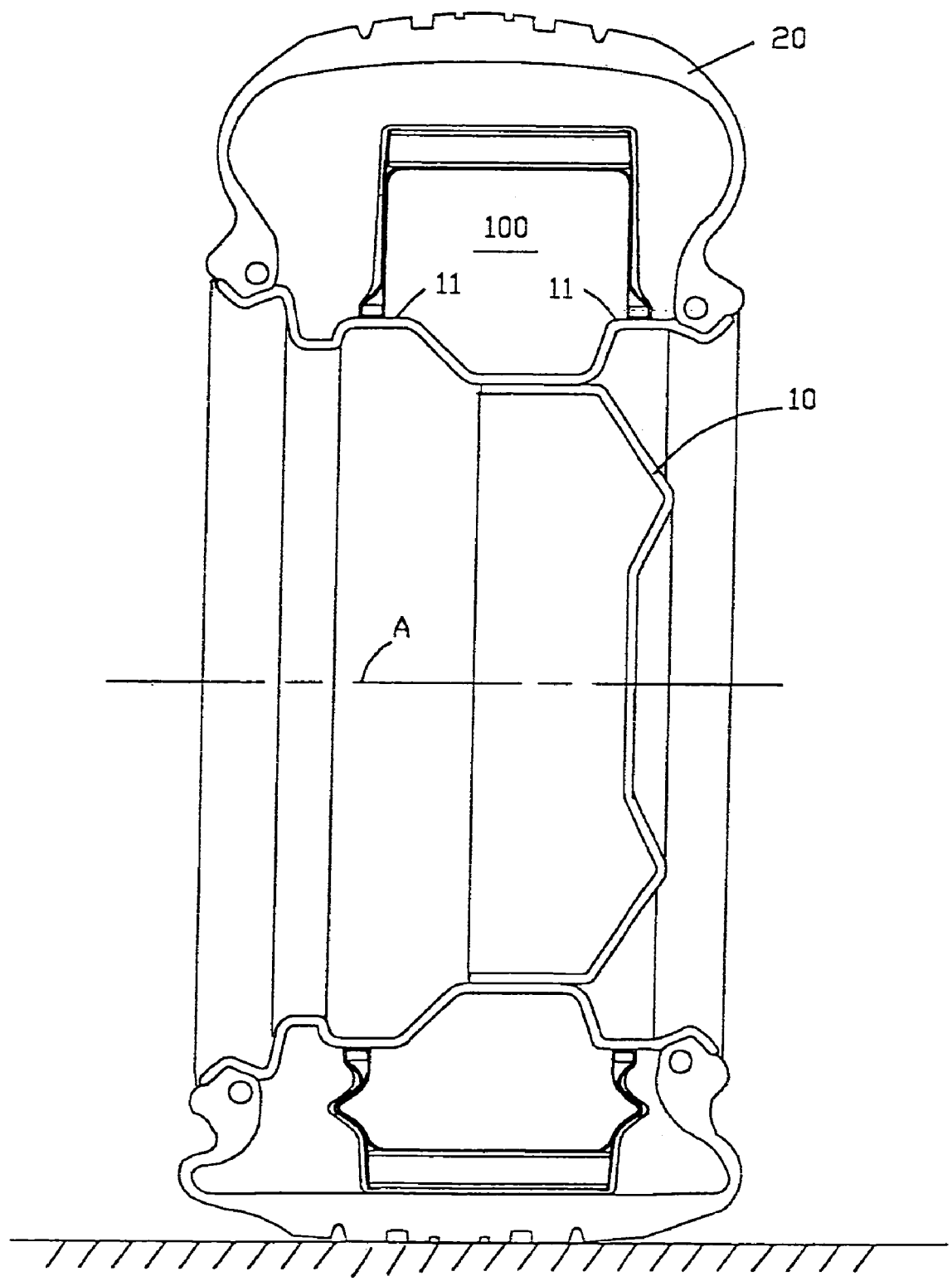
FIG. 1 shows a radial section of an assembly comprising the runflat insert 100 mounted on a wheel rim and inside a tire.

FIG. 1 shows a runflat insert 100 mounted as an assembly with specialized rim 10 and tire 20 for enabling a vehicle to run on a deflated tire. When the tire is fully inflated, the tire pneumatically supports the vehicle load, and the insert does not continuously contact the interior surface of the tire. However, as the inflation pressure of tire 20 decreases from normal operating conditions, the vertical deflection of tire 20 increases to the point where insert 100 contacts the inner surface of tire 20. FIG. 1 shows the operating condition with an uninflated tire where deformation of the runflat insert 100 supports essentially the entire vehicle load. The fully deflated tire no longer provides significant load support, and the insert structurally supports the load.

Figure 2:
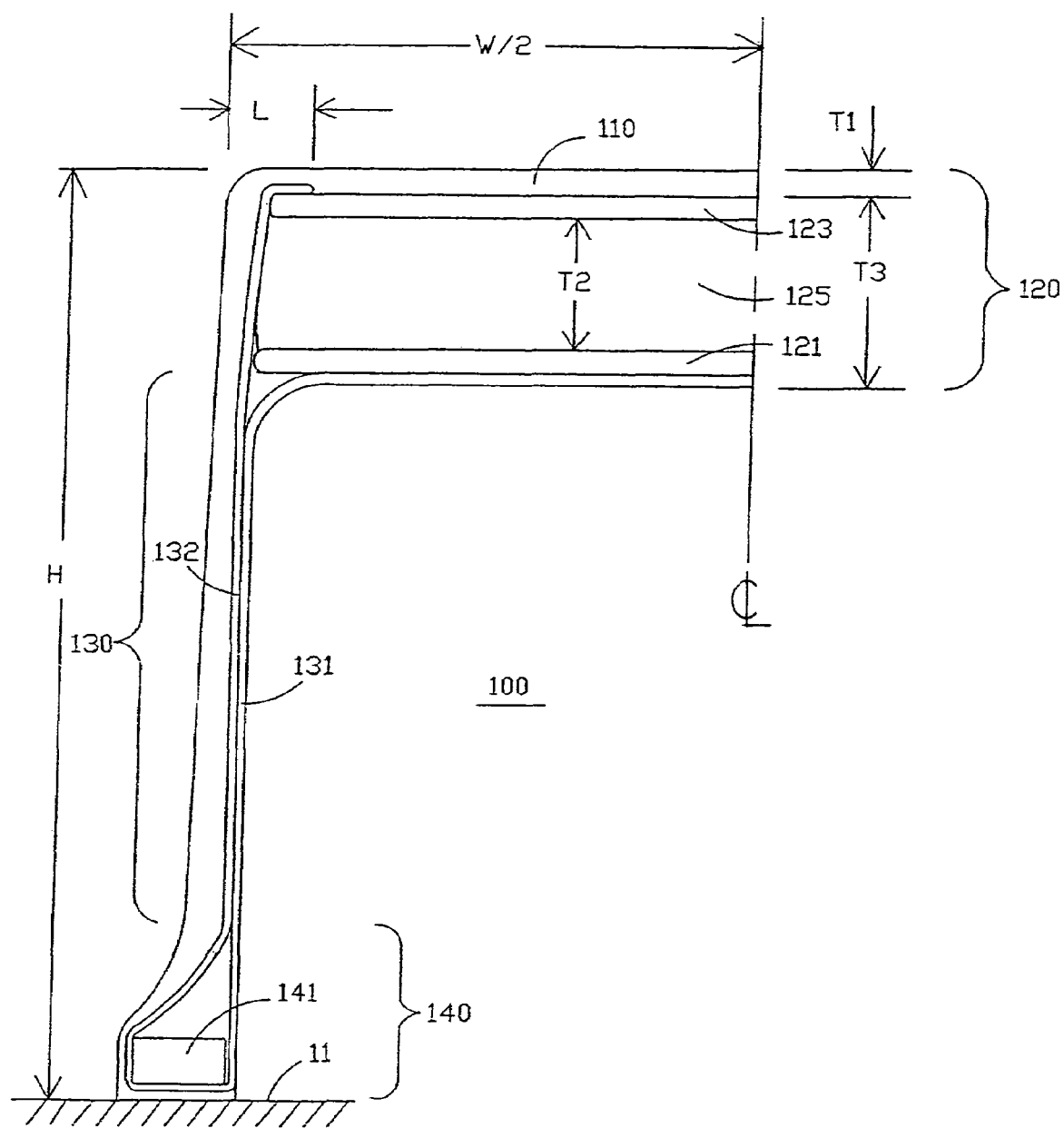
FIG. 2 shows a partial radial section of the runflat insert 100 having a high turnup carcass that overlaps the second membrane.

FIG. 2 shows a more detailed view of the insert 100 Insert 100 has an overall section width W and a section height H; the latter defined as the distance between the mounting surface 11 of the wheel 10 and the outer contacting surface of the insert. Insert 100 has a sidewall height HS measured between the radially outward extent the bead core 141 and the radially interior surface of the insert. According to the variations of the invention disclosed herein, the radially outward extent of the sidewall height HS may correspond to either the carcass layer 131 or the first membrane 121. Sidewall thickness measurements are referenced to the axial direction. Thickness measurements for the outer contacting portion, membranes, and the shear layer are referenced to the radial direction. The outer contacting portion 110 has a thickness T1, shear layer 125 has a thickness T2, and the annular band comprising the shear layer and the first and second membranes has a thickness T3.

Insert 100 comprises the structure depicted in FIG. 2. An elastomeric outer contacting portion 110 provides the load-bearing surface for contact with the interior surface of the tire. A reinforced annular band 120 is disposed radially inward from the contacting portion 110. The reinforced annular band 120 comprises a first membrane 121 adhered to the inner surface of an elastomeric shear layer 125, and a second membrane 123 adhered to the outer surface of the elastomeric shear layer 125. Sidewall portion 130 extends radially inward from the contacting portion 110 and the annular band 120. A base member 140 containing bead cores 141 fits around the wheel rim surface 11 and secures the insert to the rim in both inflated and deflated operation.

Runflat insert 100 further comprises a carcass layer having a main portion 131 that is adhered to the radially inner surface of the first membrane 121 and extending between the bead members 140. The carcass layer has a turned up portion 132 folded around the bead core 141. The flexural stiffness of the reinforced annular band 120 improves when the turned up portion 132 of the carcass is adhered to the axially outer face of the band. In the form of the invention corresponding to runflat insert 100, the turned up portion 132 extends radially outward from the base member 140, adheres to the axially outer face of the band, and terminates in an axial overlap with the second membrane 123. This overlap facilitates fabrication of the insert on conventional tire building equipment. The overlap extends an axial distance L inward from the extremity of second membrane of about 10 mm. In other forms of the invention, the turned up portion 132 may terminate without overlap, at the axial extremity of the second membrane 123, or at some lower radial location within the sidewall 130 or bead member 140.

The tensile resistance of the carcass layer is sufficient when the linear stiffness per unit circumference, measured at the mid-height of the sidewall, of the carcass reinforcements and surrounding elastomeric layers is at least 100 daN/mm. In the runflat insert 100, polyester cords comprise the reinforcement of the carcass layer 131, 132, but any material suitable as a tire reinforcement material may be used. In a non-pneumatic structure such as the runflat inserts disclosed herein, the average tensile force in each of the carcass reinforcing cords is significantly lower than in an inflated, pneumatic tire. Therefore, as segments of the sidewall rotate in and out of the contact region, there is an increased likelihood that compressive stress will occur in the carcass layer. For this reason, the most advantageous choice for carcass reinforcement material is one with good resistance to cyclic compressive loading.

Figure 3:
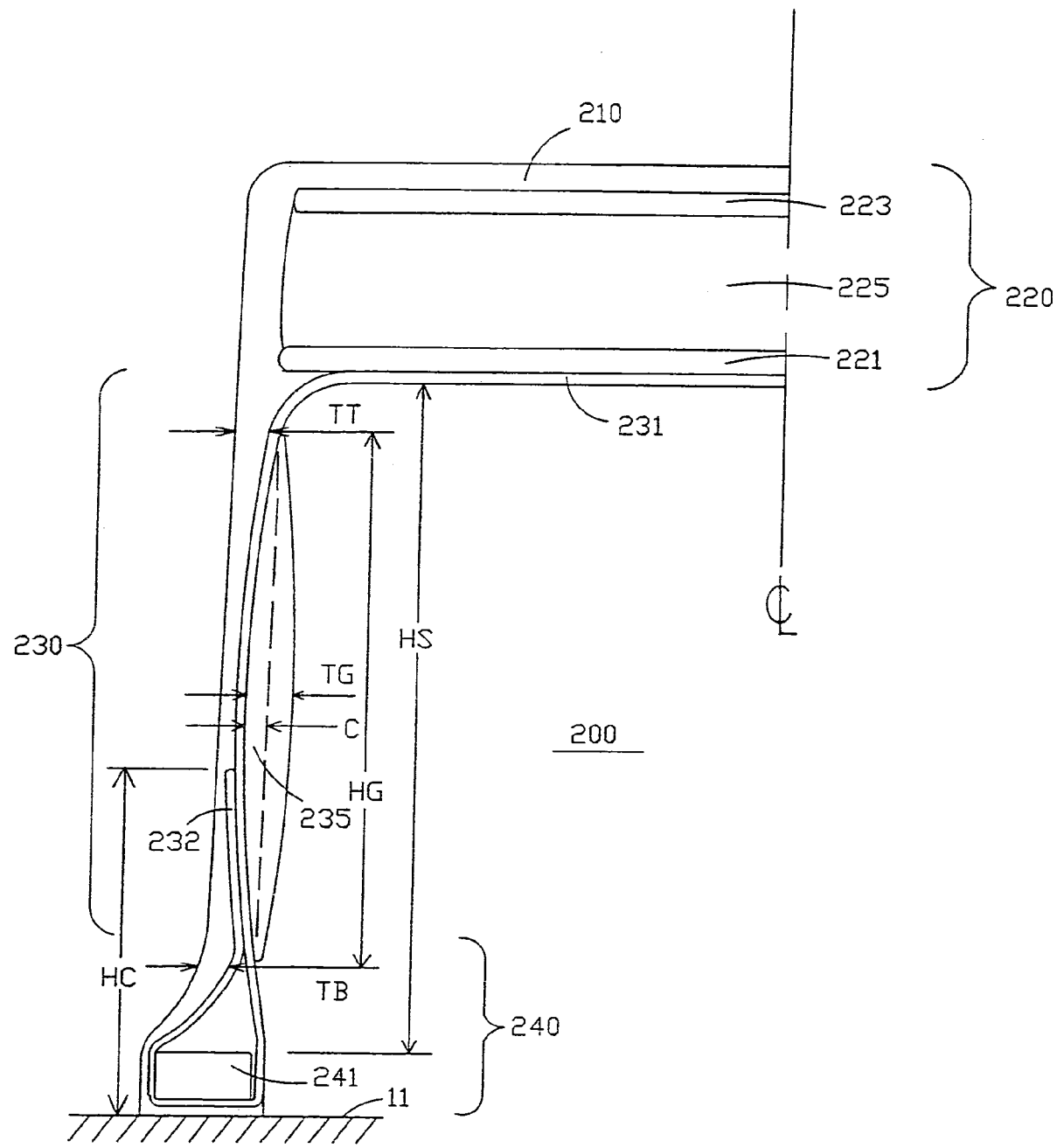
FIG. 3 shows a partial radial section of a runflat insert 200 having a single carcass layer adhered to the first membrane and having a sidewall portion biased to buckle outward under compression.

Experimentation with the runflat insert 100 has shown that elimination of the double layer carcass in the upper sidewall portion improves durability. FIG. 3 shows such an improved version of the invention. An elastomeric outer contacting portion 210 provides the load-bearing surface for contact with the interior surface of the tire. A reinforced annular band 220 is disposed radially inward from the contacting portion 210. The reinforced annular band 220 comprises a first membrane 221 adhered to the inner surface of an elastomeric shear layer 225, and a second membrane 223 adhered to the outer surface of the elastomeric shear layer 225. Sidewall portion 230 extends radially inward from the contacting portion 210 and the annular band 220. Base member 240 containing bead cores 241 fits around the wheel rim surface 11 and secures the insert to the rim in both inflated and deflated operation.

The inventors have recognized that the performance under cyclic stress of textile carcass materials improves when the carcass tension is maintained throughout each stress cycle. In a pneumatic tire, the inflation stress biases the carcass in tension. In a non-pneumatic structure such as the runflat inserts disclosed herein, no such tension bias exists. Therefore, durability of the insert improves when the deformation of the carcass layer in the portion of the insert loaded against the tire minimizes the tendency for the carcass to undergo cyclic compressive stress.

As a first means to achieve this performance improvement, runflat insert 200 has only a single carcass layer in the upper sidewall portion. Runflat insert 200 further comprises a carcass layer having a main portion 231 that is adhered to the radially inner surface of the first membrane 221 and extending between the bead members 240. The carcass layer has a turned up portion 232 folded around the bead core 241. The turned up portion 232 extends radially outward from the base member 240 and terminates a radial distance HC above the bead core 241. Runflat insert 200 further improves durability by introducing a slight outward displacement C to the carcass layer 231. This displacement is assured by applying an extra elastomeric wedge 235 to the axially interior surface of carcass layer 231 and by proper specification of the sidewall thickness at the upper and lower extents of the wedge 235. Therefore, when the sidewall portion 230 experiences vertical compressive loads, the carcass is biased to buckle consistently in an axially outward direction. The effect of the wedge 235 and of the sidewall thickness serves to minimize the tendency of the carcass to experience cyclic compressive stress.

The wedge 235 has a height HG that is between about 50 percent to about 80 percent, and preferably about 65 percent, of the sidewall height HS. The wedge 235 is positioned approximately midway within the sidewall portion 230. The displacement C of carcass layer 231 is defined as the axial distance between the centerline of the carcass layer 231 and a chord connecting the upper and lower extents of the wedge 235. The displacement C is greater than zero and less than or equal to about 8 percent of the sidewall height. C is preferably about 5 percent of the sidewall height HS. The wedge 235 has an axial thickness TG that may be greater or less than the displacement C of carcass 231. TG is between about 4 percent and about 10 percent, and preferably about 7 percent, of the sidewall height HS. Thickness measurements TB and TT specify the thickness of the sidewall material to the exterior of the carcass. TB is measured at the radially innermost extent of the wedge 235. TT is measured at the radially outermost extents of the wedge 235. TB and TT are each between about 4 percent and about 10 percent, and preferably about 8 percent, of the sidewall height HS. Runflat insert 200 was successfully constructed and evaluated using HS equal to 30 mm, C equal to 1.5 mm, HG equal to 20 mm, and TT, TB, and TG equal to 2 mm.

Figure 4:
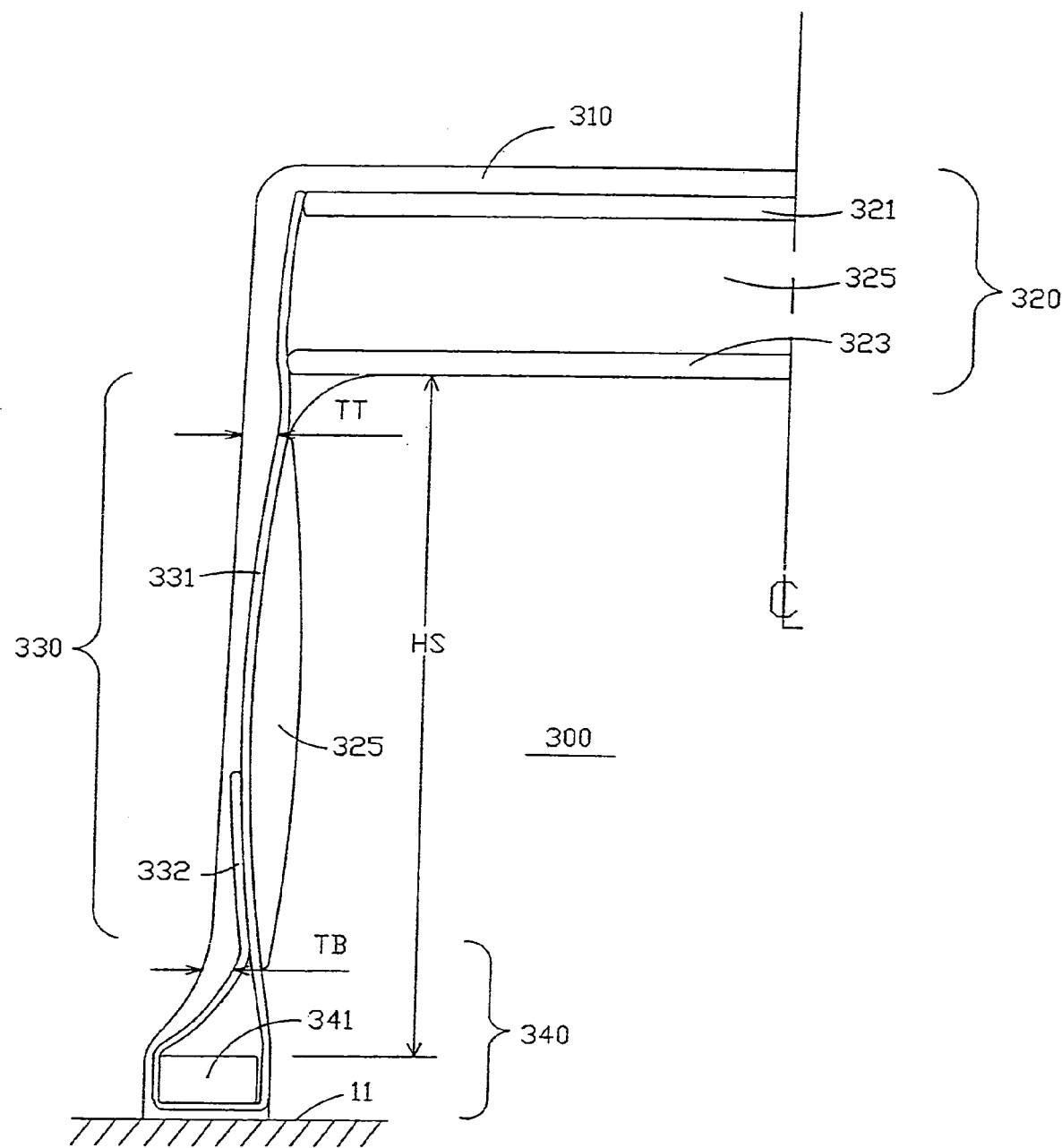
FIG. 4 shows a partial radial section of a runflat insert 300 wherein the carcass layers are discontinuous segments adhered to the annular band and having a sidewall portion biased to buckle outward under compression.

FIG. 4 shows a version of the invention optimized for load carrying. That is to say, an insert having improved load/deflection stiffness. Runflat insert 300 shares the structure of the reinforced annular band 325 common to runflat inserts 100 and 200 previously disclosed. However, runflat insert 300 has a unique carcass layer comprising at least a discontinuous carcass segment 331 anchored in the base member 340 and extending radially outward to the second membrane 321. The carcass segment 331 is adhered to an axially outermost extent of the reinforced annular band 320. That is to say, the carcass segment 331 extends radially outward at least to the axial extremity of the second membrane 321. As compared to runflat insert 200 shown in FIG. 3, the carcass arrangement shown in FIG. 4 for runflat insert 300 improves the load/deflection stiffness of the annular band 320. For ease of manufacturing, the carcass segment 331 may also overlap the second membrane 321 a distance L as previously described for the runflat insert 100 shown in FIG. 2.

The following aspects of the detailed description of the invention are common to any of the variations 100, 200, or 300 of the insert. For simplicity, each structural element references insert 100, although this shortcut is not intended in any way to limit the scope of this disclosure.

Figure 5:
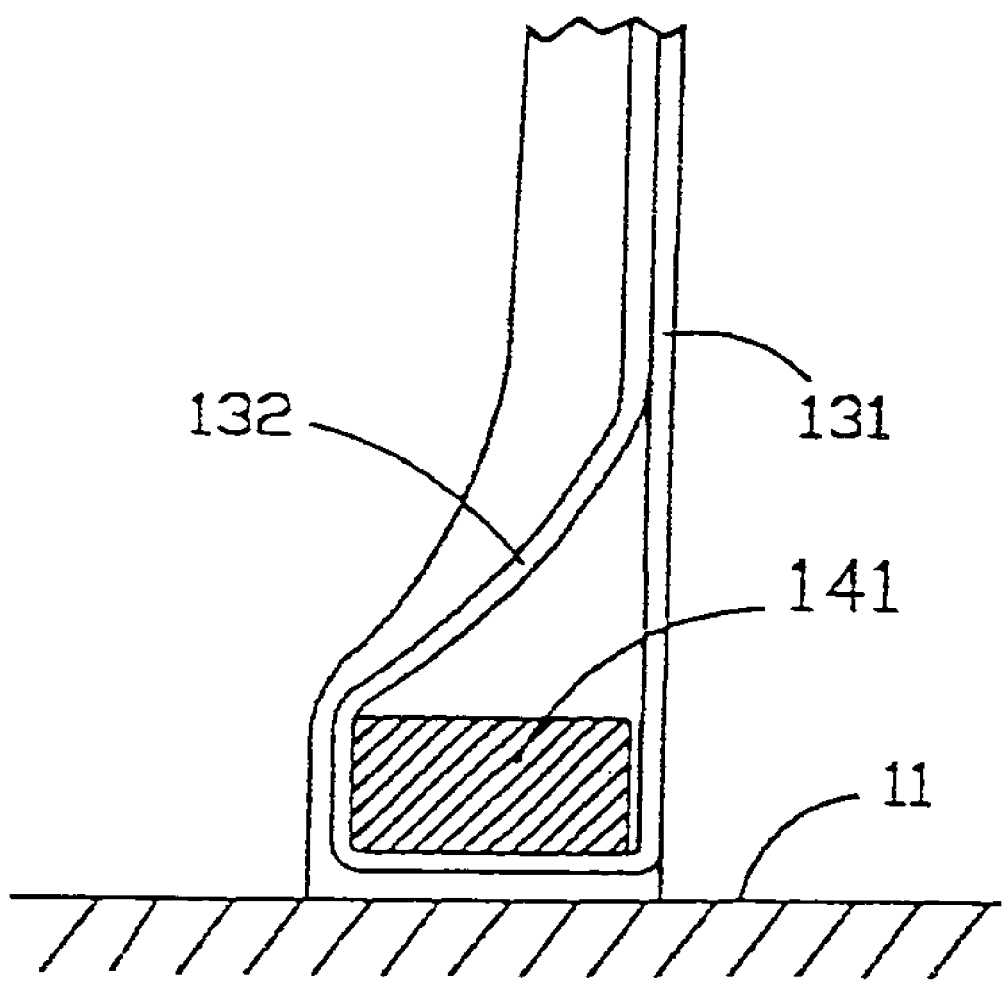
FIG. 5 shows a partial radial section of the base member of a runflat insert having a monolithic reinforcement.

The runflat inserts of the invention have bead members with a high resistance to rotation about a longitudinal axis. The resistance to rotation provides both stable axial alignment on the wheel surface 11 and good durability to flexure of the sidewall portions. FIG. 5 shows a preferred form having a monolithic reinforcement 141 of generally rectangular cross-section having a width of at least 4 mm and height of at least 2 mm. In the instant invention, suitable materials for bead reinforcements 141 should have a tensile modulus of at least about 100 GPa and a tensile yield strength of at least about 10 GPa.

The runflat inserts 100, 200, or 300 have an annular band comprising first and second membranes adhered to the elastomeric shear layer. The preferred deformation of the band occurs when the ratio of the longitudinal tensile modulus of each of the membranes to the shear modulus of the shear layer is at least 100:1. According to one form of the invention, the first and second membranes have longitudinally oriented cord reinforcements. Preferably, each membrane, 121 or 123, comprises at least two layers of mutually oblique cord reinforcements forming an angle with the tire circumferential direction of between about 10 degrees to about 20 degrees. Equation (1) below estimates the longitudinal tensile modulus of a membrane using conventional tire belt materials:

$$E'_{MEMBRANE} = (2D+t)\frac{E_{RUBBER}}{2(1-v^2)}\left[\left(\frac{P}{P-D}\right)\frac{2-(1+v)\text{SIN}^2(2\alpha)}{\text{SIN}^4\alpha} + \left(\frac{t}{D}\right)\frac{1}{\text{TAN}^2\alpha}\left(\frac{1}{\text{TAN}^2\alpha}-v\right)\right] \quad (1)$$

Where: $E_{rubber}$=Tensile modulus of the elastomeric coating material
P=Cord pace (cord centerline spacing) measured perpendicular to the cord direction
D=Cord diameter
v=Poisson's ratio for the elastomeric coating material
α=Cord angle with respect to the equatorial plan
t=Rubber thickness between cables in adjacent layers
Note that E' is the elastic modulus of the membrane times the effective thickness of the membrane The elastomeric shear layer 125 preferably has a shear modulus of elasticity between about 3 MPa and about 20 MPa. The shear layer has a low hysteresis given by tangent delta less than or equal to about 0.1. In one embodiment of the invention, shear layer 125 has a thickness T2 between about 4 mm and about 20 mm.

An advantage of the instant invention is that the contact pressure during deflated operation between the insert and the tire is a design parameter that the designer may adjust. The contact pressure between the insert and the inside of the tire is given by the product of the shear modulus of elasticity of the shear layer times the radial thickness of the shear layer divided by the radius of the outermost extent of the second membrane. The insert delivers acceptable performance when the contact pressure is between about 2 bar and about 6 bar. In general, the contact pressure of the insert will be proportionately greater than the specified tire inflation pressure.

Materials Suitable for the Shear Layer of the Tire of the Present Invention Suitable Elastomers The rubber employed in shear layer 125 may be a natural rubber or a synthetic rubber that is curable with a metal salt of a carboxylic acid- and a peroxide cure system. Blends of such rubbers may also be employed. As used herein, "rubber" and "elastomer" are synonymous.

In one preferred embodiment of the invention, the shear layer comprises a diene elastomer.

"Diene" elastomer or rubber is understood to mean, in known manner, an elastomer resulting at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the ethylene-propylene diene terpolymer (EPDM) type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a) any homopolymer obtained by polymerisation of a conjugated diene monomer having 4 to 12 carbon atoms (for example, polybutadiene);
(b) any copolymer obtained by copolymerisation of one or more dienes conjugated together or with one or more vinyl aromatic compounds having 8 to 20 carbon atoms (for example, styrene-butadiene copolymer);
(c) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$–$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert-butylstyrene, methoxystyrenes, chlorostyrenes, vinylmesitylene, divinylbenzene and vinylnaphthalene.

The copolymers in (b) above may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be statistical, sequential or microsequential elastomers, and may be prepared in dispersion or in solution; they may be coupled and/or starred or alternatively functionalised with a coupling and/or starring or functionalising agent.

Polybutadienes are suitable, and in particular those having a content of 1,2-units of between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers and in particular those having an isoprene content of between 5% and 90% by weight and a glass transition temperature ("Tg" measured according to ASTM D3418-82) of –40° C. to –80° C., isoprene-styrene copolymers and in particular those having a styrene content of between 5% and 50% by weight and a Tg of between –25° C. and –50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between –20° C. and –70° C.

In summary, particularly preferably, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers.

If a copolymer is used, the preferred are selected from the group which consists of butadiene-styrene copolymers (SBR), butadiene-isoprene copolymers (BIR), isoprene-styrene copolymers (SIR) and isoprene-butadiene-styrene copolymers (SBIR).

Still more preferably, the dienic elastomer is selected from the group consisting of natural rubber, synthetic cis-1,4 polyisoprenes and mixtures thereof. These synthetic cis-1,4 polyisoprenes have preferably a rate (mol %) of cis-1,4 bonds which is more than 90%, more preferably more than 98%.

Of course, the compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

Metal Salt of a Carboxylic Acid

The carboxylic acid is an unsaturated carboxylic acid. In one embodiment of the invention, the carboxylic acid is selected from the group consisting of methacrylic acid, ethacrylic acid, acrylic acid, cinnamic acid, crotonic acid, maleic acid, fumaric acid, itaconic acid, and mixtures thereof. Preferred carboxylic acids include acrylic acid and methacrylic acid.

The metal may comprise a metal selected from the group consisting of sodium, potassium, iron, magnesium, calcium, zinc, barium, aluminum, tin, zirconium, lithium, cadmium, and cobalt and mixtures thereof. Zinc is preferred.

Preferred metal salts include zinc dimethacrylate and zinc diacrylate. [See also Sartomer Co., Inc., "New Metallic Coagents for Curing Elastomers", April 1998. Other suitable acrylates are disclosed in Sartomer Co., Inc., Sartomer Application Bulletin, May 1998, "Chemical Intermediates—Design Unique Polymers with Sartomer's Specialty Monomers," and Sartomer Co., Inc., Sartomer Application Bulletin, October 1999, "Glass Transition Temperatures of Sartomer Products.]

Peroxides

Peroxides which may be employed to catalyze the curing of the elastomer of the shear layer (120) include, but are not limited to: di-cumyl peroxide; tert-butyl cumyl peroxide; 2,5-dimethyl-2,5BIS(tert-butyl peroxy)hexyne-3; BIS(tert-butyl peroxy isopropyl)benzene; 4,4-di-tert-butyl peroxy N-butyl valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2, 5-di-tert-butylperoxide hexane, etc. [see also Sartomer Co., Inc., "Sartomer Application Bulletin: Basic Principles of Peroxide-Coagent Curing of Elastomers," April 1997, incorporated by reference.] Amounts of peroxide curing agents included in the composition will depend upon the elastomer and coagent loading utilized. In general, such amounts may range from about 0.5 parts per hundred weight of elastomer to about 5:0 parts per hundred weight of elastomer. A more preferred range is from about 0.5 parts per hundred peroxide per hundred weight of elastomer to about 5.0 parts per hundred weight of elastomer.

Other free radical generating compounds and mechanisms can also be employed, such as ultraviolet light, beta and gamma radiation, azo compounds such as 2',2'-azobisisobutyronitrile, 2,2'-azobis(2,4-dimethylpentanenitrile), 1,1'-azobis(cyclohexanecarbonitrile), disulfides (RS-SR), and tetrazenes ($R_2N-N=N-NR_2$).

Fillers

Suitable fillers include carbon black as well as inorganic fillers ("white fillers") such as silica, aluminas, aluminum hydroxide, clays, calcium carbonate, glass fibers, microspheres, polymeric fibers such as polyester, nylon, or aramid fibers. The appropriate level of filler would be known to one of skill in the art after reading the present specification.

White Fillers

The white or inorganic filler used as reinforcing filler may constitute all or only part of the total reinforcing filler, in this latter case associated, for example, with carbon black. In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tyres, in other words which is capable of replacing a conventional tyre-grade carbon black filler in its reinforcement function.

In one embodiment of the invention, the reinforcing inorganic filler is a mineral filler of the siliceous or aluminous type, or a mixture of these two types of fillers. The silica (SiO$_2$) used may be any reinforcing silica known to the person skilled in the art, in particular any precipitated or pyrogenic silica having a BET surface area and a specific CTAB surface area both of which are less than 450 m$^2$/g, preferably from 30 to 400 m$^2$/g. Highly dispersible precipitated silicas (referred to as "HDS") are preferred, in particular when the invention is used for the manufacture of tyres having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limiting examples of such preferred highly dispersible silicas, mention may be made of the silicas BV3380 and Ultrasil 7000 from Degussa, the silicas Zeosil 1165 MP and 1115 MP from Rhodia, the silica Hi-Sil 2000 from PPG Industries, Inc. (Pittsburgh, Pa. 15272), the silicas Zeopol 8715 or 8745 from J. M. Huber Corp. (Atlanta, Ga. 30327).

The reinforcing alumina (Al$_2$O$_3$) preferably used is a highly dispersible alumina having a BET surface area from 30 to 400 m$^2$/g, more preferably between 60 and 250 m$^2$/g, an average particle size at most equal to 500 nm, more preferably at most equal to 200 nm, as described in the aforementioned application EP-A-0 810 258. Non-limitative examples of such reinforcing aluminas are in particular the aluminas A125 or CR125 (from Baïkowski Intl. Corp., Charlotte, N.C.), APA:100RDX (from Condea Servo BV, Netherlands), Aluminoxid C (from Degussa) or AKP-G015 (Sumitomo Chemical Co. Ltd., Osaka, Japan). The invention can also be implemented by using as reinforcing inorganic filler the specific aluminium (oxide-)hydroxides such as described in application WO99/28376.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible siliceous and/or aluminous fillers such as described above.

The reinforcing inorganic filler may also be used in a blend (mixture) with carbon black. Suitable carbon blacks are any carbon blacks, in particular the blacks of the type HAF, ISAF and SAF, which are conventionally used in tyres. The amount of carbon black present in the total reinforcing filler may vary within wide limits.

In the present specification, the BET specific surface area is determined in accordance with the method of Brunauer, Emmet and Teller described in "The Journal of the American Chemical Society", vol. 60, page 309, February 1938. The CTAB specific surface area is the external surface area determined in accordance with the method.

Coupling Agents Useful with the Present Invention

In the case of inorganic fillers such as silica, a coupling agent is needed to link the elastomer with the filler. The term "coupling agent" (inorganic filler/elastomer) is understood in known manner to mean an agent capable of establishing a sufficient chemical and/or physical connection between the inorganic filler and the elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the hydroxyl (OH) surface groups of the inorganic filler (for example, surface silanols in the case of silica);

X represents a functional group ("X" function) which is capable of bonding physically and/or chemically with the elastomer, for example by means of a sulphur atom;

T represents a hydrocarbon group making it possible to link Y and X.

The coupling agents must particularly not be confused with simple agents for covering the inorganic filler which, in known manner, may comprise the Y function which is active with respect to the inorganic filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions which can be used for the manufacture of tyres, the effective bonding or coupling between the silica and diene elastomer may be used, such as, for example, organosilanes, in particular polysulphurised alkoxysilanes or mercaptosilanes, or polyorganosiloxanes bearing the X and Y functions mentioned above.

The person skilled in the art will be able to adjust the content of coupling agent in the compositions of the invention, according to the intended application, the nature of the elastomer used, and the quantity of inorganic reinforcing filler.

Other Materials

The rubber compositions according to the invention may also contain, in addition to the elastomer(s), reinforcing filler, sulphur and one or more reinforcing white filler/elastomer bonding agent(s), various other constituents and additives usually used in rubber mixtures, such as plasticizers, pigments, antioxidants, vulcanization accelerators, extender oils, processing aids, and one or more agents for coating the reinforcing white filler, such as alkoxysilanes, polyols, amines etc.

Formulations

The rubber compositions are produced in suitable mixers, typically using two successive preparation phases, a first phase of thermomechanical working at high temperature, followed by a second phase of mechanical working at lower temperature. In the case of a silica mix, a three-step process may be employed. One suitable mixer is a Banbury mixer (Farrel Corp., Ansonia, Conn. 06401).

The first phase of thermomechanical working (sometimes referred to as "non-productive" phase) is intended to mix thoroughly, by kneading, the various ingredients of the composition, with the exception of the reticulation (curing) system. It is carried out in a suitable kneading device, such as an internal mixer or an extruder until, under the action of the mechanical working and the high shearing imposed on the mixture, a maximum temperature generally between 120° C. and 190° C., preferably between 130° C. and 180° C. is reached.

This first phase may itself comprise a single or several thermomechanical working stages, separated for example by one or more intermediate cooling stages. The various ingredients of the composition, elastomer(s), reinforcing filler and its coupling agent, and the various other components ("additives") may be incorporated in the mixer in one or more steps, either during the first thermomechanical stage, or staggered during the various thermomechanical stages, if applicable. The total duration of this thermomechanical working (typically between 1 and 20 minutes, for example between 2 and 10 minutes) is selected according to the specific operating conditions, in particular the maximum temperature selected, the nature and volume of the constituents, the important thing being that a good dispersion of the various ingredients which inter-react is obtained in the elastomeric matrix, thus permitting firstly good processing of the composition in the uncured state, then a sufficient level of reinforcement, after curing, by the reinforcing filler and its intermediate coupling agent.

According to a preferred embodiment of the process according to the invention, all the base constituents of the compositions according to the invention, namely (ii) the reinforcing inorganic filler and its coupling agent are incorporated in (i) the diene elastomer during the first, so-called non-productive, phase, that is to say that at least these different base constituents are introduced into the mixer and are kneaded thermomechanically, in one or more stages, until a maximum temperature of between 120° C. and 190° C., preferably between 130° C. and 180° C., is reached.

By way of example, the first (non-productive) phase is carried out in two successive steps of a duration of 1 to 5 minutes, in a conventional internal blade mixer of the "Banbury" type, the initial tank temperature of which is of the order of 60° C. First of all the elastomer (or the elastomers) is introduced, then after, for example, 1 minute's kneading, the reinforcing filler and its coupling agent; kneading is continued then, for example 1 minute later, the various additives are added, including any possible complementary covering agents or processing agents, with the exception of the vulcanisation system. When the apparent density of the reinforcing filler (or of one of the reinforcing fillers if several are used) is relatively low (as is the case, for example, of silicas), it may be preferable to divide the introduction of the latter, and if applicable that of its coupling system, into several steps in order to facilitate the incorporation thereof in the elastomeric matrix, for example half or even about ¾ of the filler after the first minute's kneading, the rest after two minutes' kneading. The thermomechanical working is thus carried out until a maximum temperature, referred to as "dropping" temperature, is obtained, which might be between 135° C. and 170° C. The block of mix thus obtained is recovered and is cooled to a temperature of less than 100° C. After cooling, a second thermomechanical stage is carried out in the same or a different mixer, with the aim of subjecting the mix to complementary heat treatment and obtaining in particular better dispersion of the reinforcing filler; of course, some of the additives, such as, for example, the stearic acid, the anti-ozone wax, the antioxidant, the zinc oxide or other additive, may not be introduced into the mixer, in their entirety or in part, until this second stage of thermomechanical working. The result of this first thermomechanical phase is then taken up on an external open mill, at low temperature (for example between 30° C. and 60° C.) and the vulcanisation system is added; the entire composition is then mixed (productive phase) for several minutes, for example between 2 and 5 minutes.

Elastomer is added first to the mixer, in the first non-productive step. Filler is then added (e.g., carbon black), and the material is dropped from the mixer. In the second step, the curative agent is added at the lower temperature. The metal salt of the carboxylic acid may be added in the productive or the non-productive mixing step.

For a silica-based composition, in the first step the silica filler and a coupling agent (e.g., Si-69) are added and mixed for a time appropriate to achieve coupling of the silane and silica. The mixture is then dropped. The batch of silica-silane is then combined with peroxides and the metal salt of the carboxylic acid (e.g., zinc dimethacrylate) and other additives. Alternatively, peroxide and an additive such as zinc oxide may be added at a lower temperature on the mill. Addition of at least 4 parts per hundred zinc stearate per hundred weight of elastomer reduces adherence of the mix to the processing equipment.

The final composition thus obtained is then calendered, for example in the form of a film or a sheet, in particular for characterisation in the laboratory, or alternatively extruded, in order to form for example a rubber profiled element used for manufacturing the shear layer of the present invention.

The reticulation (or curing) is carried out in known manner at a temperature generally between 130° C. and 200° C., preferably under pressure, for a sufficient time which may vary, for example, between 5 and 90 minutes, depending, in particular, on the curing temperature, the cross-linking system adopted and the vulcanisation kinetics of the composition in question.

In one embodiment of the invention, the shear layer has a shear modulus of elasticity from about 3 MPa to about 20 MPa. In other embodiments of the invention, the shear layer has the following approximate modulus ranges.

3 MPa to 5 MPa

6 MPa to 8 MPa

9 MPa to 11 MPa

12 MPa to 14 MPa

14 MPa to 16 MPa

17 MPa to 20 MPa

3 MPa to 7 MPa

3 MPa to 10 MPa

11 MPa to 20 MPa

The inventors found that adding a resin to obtain sufficient shear modulus for a conventional rubber might result in a product that lacks the cohesiveness to function as a shear layer. That is to say, the shear layer might be prone to tearing. Resin breaks down at the high strain levels experienced by an insert. The shear layer must be able to resist peak to peak shear strains of 0.3 or more. Conventional methods of increasing the cohesiveness of such a rubber mix, such as increasing the sulfur content, or adding more accelerator, can make the rubber brittle, less elastic, and difficult to process. It can also increase the hysteresis of the rubber mix. Again, such a mix is not suitable for the shear layer of the present invention. The inventors found that use of a metal salt of an acrylic acid, and in particular zinc dimethacrylate and zinc diacrylate, results in a composition that is easy to process, can give the necessary modulus for the shear layer for the insert for a wheel, and has high elasticity, high cohesive strength, and low tan delta.

In General (1) The following is a general formulation for one embodiment of the shear layer according to the present invention. It is expressed in "phr" (parts by weight per hundred parts of elastomer or rubber). "ZDMA" means zinc dimethacrylate.

| | |
|---|---|
| Elastomer | 100 phr |
| Metal salt of carboxylic acid | 30 phr (10–60 phr) |
| Peroxide | 1 phr (0.1–5 phr) |
| Filler | 45 phr (30–70 phr) |

Following are formulations for alternate embodiments of the shear layer:

(2)

| | |
|---|---|
| Natural Rubber | 100 phr |
| Zinc methacrylate or dimethacrylate | 30 phr (15–40 phr) |
| Peroxide | 1 phr (0.5–2 phr) |
| Filler | 45 phr (30–60 phr) |

(3)

| | |
|---|---|
| Natural Rubber | 35 phr (30–65 phr) |
| Polybutadiene | 65 phr (35–70 phr) |
| Peroxide | 1 phr (0.5–2 phr) |
| Carbon black (e.g., N650) | 50 phr (30–60 phr) |
| Zinc dimethacrylate | 15 phr (10–20 phr) |

(4)

| | |
|---|---|
| Natural Rubber | 100 phr (80–100 phr) |
| Polybutadiene | 0 phr (0–20 phr) |
| Peroxide | 1 phr (0.5–2 phr) |
| Carbon black | 0 phr |
| Silica | 45 phr (40–70 phr) |
| ZDMA | 40 phr (20–50 phr) |

(5)

| | |
|---|---|
| Natural rubber | 80 phr (50–90 phr) |
| Polybutadiene | 20 phr (10–50 phr) |
| Peroxide | 1 phr (0.5–2.0 phr) |
| Carbon black (e.g., N650) | 30 phr (30–60 phr) |
| ZDMA | 35 phr (20–40 phr) |

The invention may be further understood with reference to the following non-limiting examples.

EXAMPLE 1

Elastomeric materials for the shear layer were prepared according to the present invention.

TABLE 1

| | Control 1 | Control 2 | Control 3 | Mix 1 | Mix 2 | Mix 3 | Mix 4 | Mix 5 |
|---|---|---|---|---|---|---|---|---|
| Natural Rubber | 35 | 35 | 100 | 35 | 80 | 100 | 100 | 80 |
| Polybutadiene | 65 | 65 | | 65 | 20 | | | 20 |
| Zeosil 1165 MP (Silica) | | | 62 | | | 45 | 45 | 45 |
| N650 (carbon black) | 65 | 65 | | 50 | 30 | | | |
| X50S (silane coupler) | | | 9.9 | | | 5.8 | 5.8 | 5.8 |
| Peroxide (dicup 40 C [40%]) | | | | | 5 | 2.5 | 2.5 | 2.5 |
| Zinc dimethacrylate | | | | 15 | 35 | 40 | 40 | 40 |
| ZnO | 4 | 4 | 4 | | 4 | 4 | 4 | 4 |

[The figures are expressed in parts by weight per hundred parts of elastomer or rubber]

[highly dispersible silica "Zeosil 1165MP" manufactured by Rhodia in the form of micropearls (BET and CTAB: approximately 150–160 $m^2/g$)]

[N650 carbon black is available from Engineered Carbons, Inc. Borger, Tex. 79008, and other suppliers]

[Si69 is bis(3-triethoxysilylpropyl)tetrasulphide having the formula $[(C_2H_5O)_3Si(CH_2)_3S_2]_2$ by Degussa Corp. (Ridgefield Park, N.J.) under the name Si69 (or X50S when supported at a content of 50 percent by weight on carbon black)]

TABLE 2

| | Control 1 | Control 2 | Control 3 | Mix 1 | Mix 2 | Mix 3 | Mix 4 | Mix 5 |
|---|---|---|---|---|---|---|---|---|
| Mooney Viscosity (1) | 83 | 85 | 83 | 56 | 39 | 49 | 48 | 55 |
| MA 10 (MPa) (2) | 12 | 10 | 12 | 16 | 21 | 10 | 17 | 21 |
| MA 50 (MPa) (3) | 9.2 | 7.5 | 6.7 | 12.5 | 11.2 | 4.9 | 7.3 | 9.4 |
| MA 100 (MPa) (4) | 9.6 | 6.6 | 6 | Broke | 10 | 4 | 5.7 | 7.3 |
| G' at 10% shear strain (5) | 4.9 | 3.1 | 4 | 4.9 | | | | |
| G' at 40% shear strain (5) | Glue broke | 2.9 | 3.1 | 4.5 | | | | |

TABLE 2-continued

|  | Control 1 | Control 2 | Control 3 | Mix 1 | Mix 2 | Mix 3 | Mix 4 | Mix 5 |
|---|---|---|---|---|---|---|---|---|
| Tangent delta at 10% shear (5) | 0.045 | 0.046 | 0.077 | 0.041 | | | | |
| Tangent delta at 40% shear (5) | Glue broke | 0.034 | 0.078 | 0.038 | | | | |
| P60(rebound 60° C.) | 9 | 12.5 | 21 | 12 | 22 | 27 | 30 | 29 |
| Elastic shear limit (%) 100° C. | >50% | >50% | >100% | >50% | >100% | >100% | >100% | >100% |
| Cohesive Stress (MPa) 100° C. (6) | | | 14.8 | 7.4 | 9.9 | 14.8 | 14.9 | 13.3 |
| Cohesive Strain (MPa) 100° C. (7) | | | 213 | 50 | 90 | 395 | 332 | 246 |
| Dimensional stability (8) | 2 | 2 | 2 | 1 | 1 | 1 | 1 | 1 |
| Aging Stability (9) | 3 | 2 | 3 | 1 | 1 | 1 | 1 | 1 |

(1) ML(1 + 4) 100° C. Lower no. = lower viscosity
(2) Tensile modulus at 10% strain, 23° C.
(3) Tensile modulus at 50% strain, 23° C.
(4) Tensile modulus at 100% strain, 23° C.
(5) 10 hz, 100° C.
(6) Scott ultimate stress @100° C.
(7) Scott ultimate strain to rupture 100° C.
(8) Relative (based on MTS), "1" is best, "3" is worst.
(9) Relative, "1" is best, "3" is worst Dynamic properties were measured on an MTS loading rig (MTS Systems Corp., Eden Prairie, Minn. 55344) at 10 hertz under pure shear mode of deformation.

Under tensile loading, the force divided by the original area of the sample under duress is called the stress (shown above in units of mega Pascals). The displacement (movement or stretch) of the material is called the strain. Normally the strain is given as the change in length divided by the original length, and the units are dimensionless. The modulus is the slope of the curve of stress versus strain (stress in the ordinate, strain in the abscissa). The elastic shear modulus (G') of a material is the ratio of the elastic (in-phase) stress to strain and relates to the ability of a material to store energy elastically. The loss modulus (G") of a material is the ratio of the viscous (out of phase) component to the shear strain, and is related to the material's ability to dissipate stress through heat. The ratio of these moduli (G'/G") is defined as tangent delta, and indicates the relative degree of viscous to elastic dissipation, or damping of the material. A low tan delta means higher resilience and less hysteresis.

G' represents the shear modulus in mega Pascals, and tan delta represents the relative hysteresis of the material.

ML(1+4) 100° C. Lower no.=lower viscosity. This is the Mooney viscosity test carried out with a large rotor. It is pre-heated for one minute while stationary, and rotated for four minutes test time. The values are read at the end of five minutes.

MA10, MA50 and MA100 are tensile modulus tests, at 10%, 50% and 100% elongation, respectively. They are measured using an Instron tensile tester (Instron, Inc. Canton, Mass. 02101).

The test for tangent delta at 10% shear, and at 40% shear are carried out using an MTS, Inc. tester machine (MTS Systems Corporation, Eden Prairie, Minn. 55344).

The P60 test is a hysteresis test measuring the angle of rebound of a pendulum as it hits a rubber sample. The first five initial strikes are ignored, then the next three strikes are measured.

The elastic shear limit test is carried out with an MTS tester. A sample is stretched until its stress/strain curve goes outside the linear region.

In the Scott ultimate stress test, a sample is stretched to rupture. The sample is stretched at a constant speed.

The dimensional stability test is carried out on an MTS tester.

The aging test is carried out on an MTS machine after aging the sample for 7, 14, or 28 days at 77 degrees centigrade.

The tables demonstrate that by using the metal salt of a carboxylic acid with a free radical generator (ZDMA with peroxide), along with a filler such as carbon black or silica, a set of properties can be obtained that are superior to those of a conventional rubber system. That is to say the present invention can achieve the best characteristics for the shear layer of a run-flat insert for a tire such as high modulus, low hysteresis, and high cohesive strength.

Various modifications and variations of the present invention will be apparent to those of skill in the art after reading the instant specifications, drawings, and appended claims. These modifications and variations are meant to fall within the scope of the appended claims.

We claim:

1. A runflat insert for enabling a vehicle to run on a deflated tire, mounted in an assembly comprising a pneumatic tire and a wheel rim, said insert being mounted inside the air cavity of the tire and secured to the wheel rim, said insert comprising:
   a) an elastomeric outer contacting portion for contacting the interior surface of the tire during deflated operation of the tire,
   b) a reinforced annular band disposed radially inward of said outer contacting portion, wherein said band comprises an elastomeric shear layer, at least a first membrane adhered to the radially inward extent of said elastomeric shear layer and at least a second membrane adhered to the radially outward extent of said elastomeric shear layer,
   c) at least one sidewall portion extending radially inward from said contacting portion for connecting said annular band to a base member fitted around the wheel rim for securing said insert to the rim, and d) at least one carcass layer adhered to said annular band, and said carcass layer extending radially inward from said annular band and anchored in said base member, wherein the shear layer comprises an elastomeric composition having a metal salt of a carboxylic acid, and wherein the carboxylic acid is selected from the group consisting of unsaturated carboxylic acids.

2. The runflat insert of claim 1 wherein a ratio of the longitudinal tensile modulus of each of said membranes to the shear modulus of said shear layer is at least 100:1.

3. The runflat insert of claim 1, wherein said elastomeric shear layer has a thickness between about 4 mm and about 20 mm.

4. The runflat insert of claim 1, wherein said elastomeric shear layer has a shear modulus of elasticity of between about 3 MPa and about 20 MPa.

5. The runflat insert of claim 1, wherein said elastomeric shear layer has a shear modulus of elasticity of about 3 MPa to about 10 MPa.

6. The runflat insert of claim 1, wherein said elastomeric shear layer has a shear modulus of elasticity of about 3 MPa to about 7 MPa.

7. The runflat insert of claim 1, wherein said elastomeric shear layer has a tangent delta of less than or equal to about 0.1.

8. The runflat insert of claim 1, wherein the product of the shear modulus of elasticity of said shear layer times the radial thickness of said shear layer divided by the radius of the outermost extent of said second membrane is between about 2 bar and about 6 bar.

9. The runflat insert of claim 1, wherein the product of the shear modulus of elasticity of said shear layer times the radial thickness of said shear layer divided by the radius of the outermost extent of said second membrane is about 3 bar.

10. The runflat insert of claim 1 wherein the elastomeric composition is selected from the group consisting of natural and synthetic elastomers, and mixtures thereof.

11. The runflat insert of claim 1 wherein the elastomeric composition of the shear layer is selected from the group consisting of dienic elastomers.

12. The runflat insert of claim 11 wherein the dienic elastomer is selected from the group consisting of polybutadienes, polyisoprenes, butadiene copolymers, isoprene copolymers and mixtures thereof.

13. The runflat insert of claim 1 wherein the elastomeric composition of the shear layer is selected from the group consisting of natural rubber, synthetic polyisoprenes, styrene-butadiene copolymers, butadiene-isoprene copolymers, isoprene-butadiene-styrene copolymers, and mixtures thereof.

14. The runflat insert of claim 11 wherein the dienic elastomer is selected from the group consisting of natural rubber, synthetic cis-1,4 polyisoprenes, and mixtures thereof.

15. The runflat insert of claim 1 wherein the carboxylic acids are selected from the group consisting of methacrylic acid, ethacrylic acid, acrylic acid, cinnamic acid, crotonic acid, maleic acid, fumaric acid, itaconic acid, and mixtures thereof.

16. The runflat insert of claim 1 wherein the metal of the metal salt is selected from the group consisting of sodium, potassium, iron, magnesium, calcium, zinc, barium, aluminum, tin, zirconium, lithium, cadmium, cobalt and mixtures thereof.

17. The runflat insert of claim 1 wherein the metal salt is selected from the group consisting of zinc diacrylate and zinc dimethacrylate.

18. The runflat insert of claim 1 wherein the elastomeric composition of the shear layer further includes a curing agent comprising a composition producing free radicals.

19. The runflat insert of claim 18 wherein the curing agent is selected from the group consisting of peroxides, azo compounds, disulfides, and tetrazenes.

20. The runflat insert of claim 19 wherein the curing agent is a peroxide.

21. The runflat insert of claim 20 wherein the peroxide is selected from the group consisting of di-cumyl peroxide; tert-butyl cumyl peroxide; 2,5-dimethyl-2,5BIS(tert-butyl peroxy)hexyne-3; BIS(tert-butyl peroxy isopropyl)benzene; 4,4-di-tert-butyl peroxy N-butyl valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane and mixtures thereof.

22. The runflat insert of claim 1 wherein the shear layer comprises:
(a) for 100 phr elastomer;
(b) approximately 10 to 60 phr metal salt of carboxylic acid;
(c) approximately 30 to 70 phr filler; and
(d) approximately 0.5 to 2 phr peroxide.

23. The runflat insert of claim 1 wherein the shear layer comprises:
(a) for 100 phr natural rubber;
(b) approximately 15–40 phr selected from the group consisting of zinc diacrylate and zinc dimethacrylate;
(c) approximately 30–60 phr filler; and
(d) approximately 0.5 to 2 phr peroxide.

24. The runflat insert of claim 1 wherein the shear layer comprises:
(a) for 30–65 phr natural rubber;
(b) approximately 35–70 phr polybutadiene;
(c) approximately 10–20 phr selected from the group consisting of zinc diacrylate and zinc dimethacrylate;
(d) approximately 30–60 phr carbon black; and
(e) approximately 0.5 to 2 phr peroxide.

25. The runflat insert of claim 1 wherein the shear layer comprises:
(a) for 80–100 phr natural rubber;
(b) approximately 0–20 phr polybutadiene;
(c) approximately 20–50 phr selected from the group consisting of zinc diacrylate and zinc dimethacrylate;
(d) approximately 40–70 phr silica; and
(e) approximately 0.5 to 2 phr peroxide.

26. The runflat insert of claim 1 wherein the shear layer comprises:
(a) for 50–90 phr natural rubber;
(b) approximately 10–50 phr polybutadiene;
(c) approximately 20–40 phr selected from the group consisting of zinc diacrylate and zinc dimethacrylate;
(d) approximately 30–60 phr carbon black; and
(e) approximately 0.5 to 2 phr peroxide.

27. The runflat insert of claim 1 wherein the shear layer comprises:
(a) for 80–100 phr natural rubber;
(b) approximately 0–20 phr polybutadiene;
(c) approximately 30–50 phr selected from the group consisting of zinc diacrylate and zinc dimethacrylate;
(d) approximately 30–70 phr silica; and
(e) approximately 0.5 to 2 phr peroxide.

* * * * *